United States Patent [19]

Guerette

[11] Patent Number: 4,934,566

[45] Date of Patent: Jun. 19, 1990

[54] BULK LIQUID DISPENSING, COUNTING AND RECORDING SYSTEM

[75] Inventor: Alvin Guerette, Laval, Canada

[73] Assignee: B.V.L. Controls, Ltd., Laval, Canada

[21] Appl. No.: 336,463

[22] Filed: Apr. 11, 1989

[51] Int. Cl.$^5$ ............................................. B67D 5/22
[52] U.S. Cl. ..................................... 222/38; 222/505; 222/559; 137/554
[58] Field of Search .................. 222/36, 38, 505, 509, 222/551, 559; 137/554, 558

[56] References Cited

U.S. PATENT DOCUMENTS

| | | | |
|---|---|---|---|
| 1,953,163 | 4/1934 | Geddes | 222/38 |
| 1,959,501 | 5/1934 | Ross | 222/38 |
| 2,600,604 | 6/1952 | Atherton | 222/38 |
| 3,257,033 | 6/1966 | Stott | 222/36 |
| 3,257,034 | 6/1966 | Dumm, III | 222/36 |
| 4,225,057 | 9/1980 | Horn | 222/36 |
| 4,226,343 | 10/1980 | Fling | 222/505 |
| 4,641,003 | 2/1987 | Alfors | 200/335 |
| 4,703,770 | 11/1987 | Arzberger et al. | 222/333 |

*Primary Examiner*—H. Grant Skaggs
*Assistant Examiner*—Steve Reiss

[57] ABSTRACT

A portion monitor for mounting on a liquid dispensing appratus having a body, a pivotable open and closing mechanism connected to the slidable liquid control stem, a separate control box, the portion monitor comprised of a magnet installed in the end of the liquid control stem closest to said pivotable open and closing mechanism, a Hall effect digital switch supported opposite the end of the slidable liquid control stem nearest the pivotable open and closing mechanism, said magnet energizing said Hall effect digital switch when the slidable liquid control stem is in the open position and turn off said Hall effect digital switch when the liquid control stem is in the closed position.

8 Claims, 2 Drawing Sheets

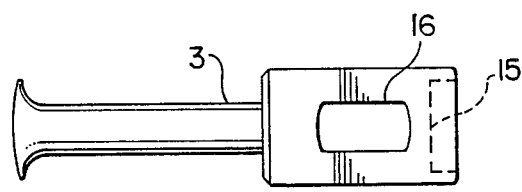
FIG. 4
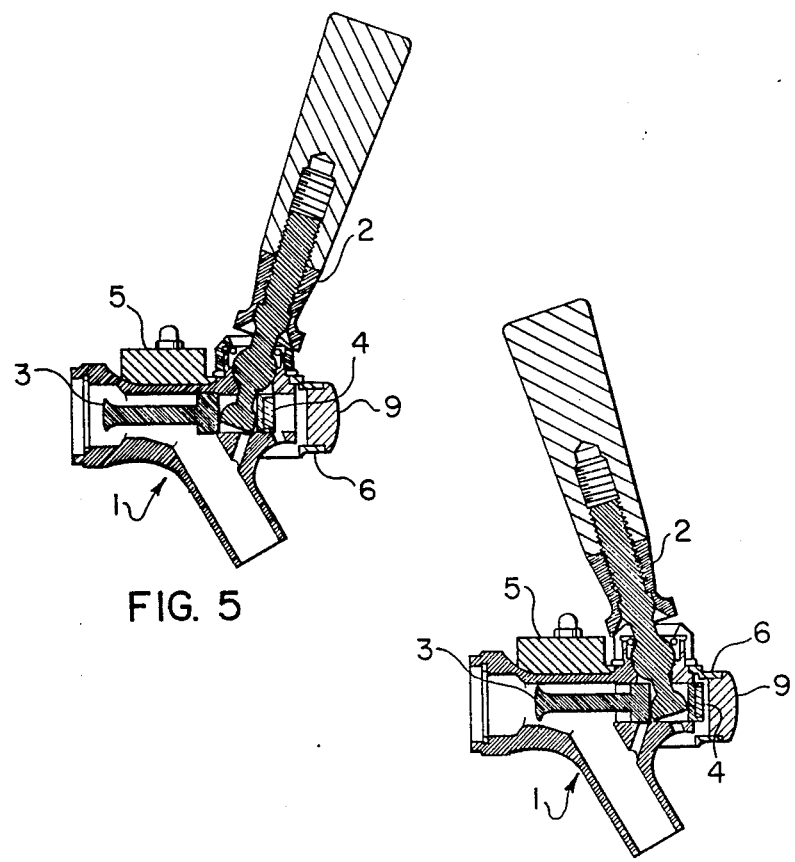
FIG. 5
FIG. 6

BULK LIQUID DISPENSING, COUNTING AND RECORDING SYSTEM

This invention relates to a portion monitor for a liquid dispensing apparatus including a saddle for application on existing liquid dispensing apparatus, the saddle including a Hall effect digital switch supported by said saddle exteriorly of said dispensing apparatus and adapted to count portion dispensed. The dispensed portions are recorded at a separate control box.

In dispensing liquids using automatic dispensing machines which dispense a predetermined measure of liquid it is important that each portion dispensed by the equipment be accurately recorded so that the daily receipts balance with the portions of liquid dispensed. It is also important that the portion monitor indicate to the operator the completion of dispensing of each portion so that the operator may immediately replace the filled container with an empty container. It is also important that an indicator be associated with the portion monitor to indicate to the proprietor that the portion monitor is operating or is disconnected.

In some liquid dispensing apparatus currently in use, mercury switches are attached to the handle of the liquid dispensing apparatus. When the dispensing handle is moved from the closed to a dispensing position a circuit is activated to count the portion dispensed. However, it has been found that the mercury switches may be manipulated so that the mercury switches do not count portions being dispensed. Furthermore, as seen in my U.S. Pat. No. 4,655,374 the mercury switch is connected by a wire to a control box. The repeated moving of the handle, cleaning of the dispensing apparatus valve and accidental striking of the wire may lead to wear and need to replace the wire between the mercury switch and the control box.

In the instant invention the portion monitor is placed over the upper half of the dispensing apparatus valve in such a manner that the Hall effect digital switch is disposed on the front of the dispensing apparatus valve opposite the end of the slidable liquid control stem of the dispensing apparatus valve. When the handle of the dispensing apparatus valve is pushed forward the slidable liquid control stem moves longitudinally towards the front of the dispensing apparatus causing the Hall effect digital switch to close. There are no moving parts in the portion monitor and therefore less wear on the wire extending from the portion monitor to the control box. As the portion monitor is directly responsive to opening of the slidable liquid control stem, liquid cannot be dispensed without actuating the portion monitor. Whenever the circuit between the control box and portion monitor is disconnected or malfunctions a red light on the control panel will light up so that the proprietor is aware that the portion monitor is either disconnected or is not functioning properly.

The portion monitor also features a small red light which appears immediately below the handle. This red light lights up as soon as the measured portion has been dispensed informing the operator that the container under the spout may be removed and an empty container substituted therefor.

One embodiment of the invention comprises a portion monitor for a liquid dispensing apparatus having a body, a pivotable open and closing mechanism connected to the slidable liquid control stem, a separate control box, the portion monitor comprised of a magnet adapted to be installed in the end of the liquid control stem closest to said pivotable open and closing mechanism, a Hall effect digital switch adapted to be supported opposite the end of the slidable liquid control stem nearest the pivotable open and closing mechanism, said magnet being adapted to energize said Hall effect digital switch when the slidable liquid control stem is in the open position and turn off said Hall effect digital switch when the liquid control stem is in the closed position.

In another embodiment of the invention the support for the Hall effect digital switch is mounted on a saddle adapted to fit over the top portion of the body of the liquid dispensing apparatus.

In another aspect of the invention the portion monitor is connected to the control box of the liquid dispensing apparatus and a signal on said control box signals when the portion monitor is disconnected or inoperative.

In still another aspect of the invention the portion monitor includes a light on the top of the saddle to indicate the end of each dispensing cycle.

In the drawings:

FIG. 4 is a top view of the slidable liquid control stem with a magnet in the end of the stem nearest the handle.

FIG. 5 is a cross-section of a dispensing apparatus valve with the handle in open position.

FIG. 6 is a cross-section of a dispensing apparatus valve with the handle in closed position.

Figure 1:
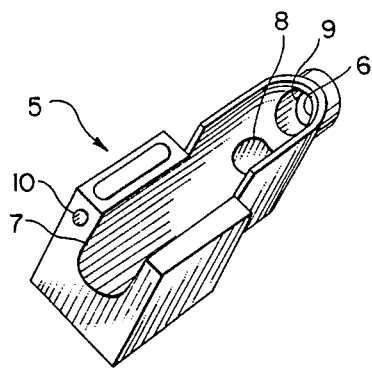
FIG. 1 is a bottom perspective view of the portion monitor showing the saddle which when turned over fits over the top of the dispensing apparatus valve.

Referring to FIG. 5, there is shown a dispensing apparatus valve having a body 1, a pivotal open and closing mechanism 2, a slidable liquid control stem 3, a magnet 4 in one end of the slidable liquid control stem 3, a portion monitor 5 mounted on the upper portion of body 1, a Hall effect digital switch 6 disposed below one end of the portion monitor 5 opposite the magnet 4 embedded in one end of the slidable liquid control stem 3.

Figure 2:
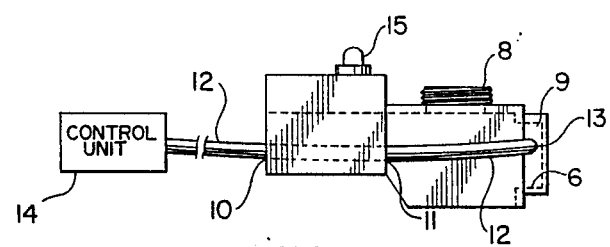
FIG. 2 is a side elevation view of the portion monitor.

FIG. 1 shows a bottom perspective view of portion monitor 5 showing the saddle 7 which is adapted to fit over the body 1 of the dispensing apparatus valve. A large aperture 8 in the portion monitor 5 is adapted to receive the bottom half of pivotal open and closing mechanism 2. Cylindrical space 9 at the closed end of portion monitor 5 receives and retains the Hall effect digital switch 6. The smaller aperture 10 in the open end of portion monitor 5 and an oppositely disposed aperture 11 are adapted to receive an electric wire 12 as seen in FIG. 2. The electric wire 12 is connected at one end at 13 to the Hall effect digital switch 6 and at the other end to a control unit 14. The light 15 on top of the portion monitor 5 is also electrically connected to the control unit 14 and lights up when dispensing of each individual portion is completed.

Figure 3:
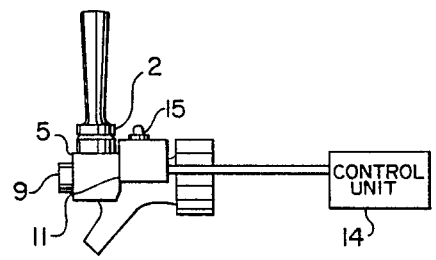
FIG. 3 is a side elevation view of the portion monitor mounted on a dispensing apparatus valve.

FIG. 3 shows a side elevation view of portion monitor 5 mounted on the exterior of a dispensing apparatus valve.

FIG. 4 is a top view of slidable liquid control 3 containing a cylindrical space 15 at one end in which magnet has been inserted. The slidable liquid control 3 includes aperture 16 which is adapted to receive the bottom portion pivotal opening and closing mechanism 2.

FIG. 5 represents a dispensing apparatus valve with the pivotal opening and closing mechanism 2 in the closed position. In the closed position, the magnet 4 in the end of slidable liquid control stem 3 is distant from the Hall effect digital switch 6.

FIG. 6 represents the same dispensing apparatus in which the pivotal opening and closing mechanism 2 is in the open position. In the open position the magnet 4 in the end of the slidable liquid control stem 3 is in close proximity to the Hall effect digital switch 6, and the Hall effect digital switch is energized by the proximity of magnet 4.

It will be noted that no change has been made to the interior of the existing dispensing apparatus valve. In order to convert most standard dispensing apparatus valves it is only necessary to remove the slidable liquid control stem 3, machine a cylindrical space 15 at the end of slidable liquid control stem 3 facing towards the front of the dispensing apparatus valve and mount a portion monitor 5 supporting a Hall effect digital switch 6 on the portion monitor 5 in such a fashion that the Hall effect digital switch 6 is disposed on the centerline of travel of the slidable liquid control stem 3. The dispensing apparatus valve itself is not part of this invention except to the extent that a magnet is attached to or inserted in the slidable liquid control stem. The measurement of portions, the time sequence to fill containers are all controlled from the existing control box. One additional feature of this invention is the addition to the control box of a red light or other signal which comes on whenever the portion monitor 5 is disconnected or inoperative.

The portion monitor 5 is fabricated of molded plastic. The magnet 4 is made of good magnetic material and the Hall effect digital switch is of a type generally available on the market.

In operation as seen in FIG. 6, when the pivotal open and closing mechanism 2 is closed the magnet 4 is proximate the Hall effect digital switch 6. After a portion has been dispensed the portion monitor 5 will send a signal to a counting mechanism which will record the serving of one portion. The portion monitor will not send a signal to the counting mechanism if the pivotal open and closing mechanism 2 is merely opened and closed or is not opened for the time required to dispense a full portion.

It will be appreciated by those skilled in the art that liquid dispensing apparatus have varied designs and that the portion monitoring device of this invention may have to be moulded to different forms to snugly fit on the exterior of various liquid dispensing apparatus. It will also be appreciated that the concept of utilizing a magnet on the slidable liquid control stem can be applied to any moving liquid control stem without detracting from the concept of this invention.

I claim:

1. A portion monitor for mounting on a liquid dispensing apparatus having a body, a pivotable open and closing mechanism connected to the slidable liquid control stem, a separate control box,
   the portion monitor comprised of a magnet installed in the end of the liquid control stem closest to said pivotable open and closing mechanism, a Hall effect digital switch supported opposite the end of the slidable liquid control stem nearest the pivotable open and closing mechanism, said magnet energizing said Hall effect digital switch when the slidable liquid control stem is in the open position and turn off said Hall effect digital switch when the liquid control stem is in the closed position.

2. The portion monitor of claim 1 in which the support for the Hall effect digital switch is mounted on a saddle fitted over the top portion of the body of the liquid dispensing apparatus.

3. The portion monitor of claim 2 which is connected to the control box of the liquid dispensing apparatus, a signal on said control box signalling when the portion monitor is disconnected or inoperative.

4. The portion monitor of claim 3 which includes a light on the top of the saddle to indicate the end of each dispensing cycle.

5. A liquid dispensing apparatus having a body, a pivotable open and closing mechanism connected to a slidable liquid control stem, a separate control box and a portion monitor, the improvement comprising a portion monitor comprised of a magnet in the end of the liquid control stem closest to said pivotable open and closing mechanism, a Hall effect digital switch supported opposite the end of the slidable liquid control stem nearest the pivotable open and closing mechanism, said magnet energizing said Hall effect digital switch when the slidable liquid control stem is in the open position and turn off said Hall effect digital switch when the liquid control stem is in the closed position.

6. The liquid dispensing apparatus of claim 5 in which the support for the Hall effect digital switch is mounted on a saddle fitted over the top portion of the body of the liquid dispensing apparatus.

7. The liquid dispensing apparatus of claim 6 in which the portion monitor is connected to the control box of the liquid dispensing apparatus, a signal on said control box signalling when the portion monitor is disconnected or inoperative.

8. The liquid dispensing apparatus of claim 7 in which the portion monitor includes a light on the top of the saddle to indicate the end of each dispensing cycle.

* * * * *